United States Patent
Hwang et al.

(10) Patent No.: US 6,590,893 B1
(45) Date of Patent: Jul. 8, 2003

(54) ADAPTIVE TRANSMISSION SYSTEM IN A NETWORK

(75) Inventors: Chien-Meen Hwang, San Jose, CA (US); Eugen Gershon, San Jose, CA (US); Maged F. Barsoum, Sunnyvale, CA (US); Hungming Chang, Cupertino, CA (US); Muoi V. Huynh, San Jose, CA (US); Fred Berkowitz, Palo Alto, CA (US); Bin Guo, Fremont, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/286,997

(22) Filed: Apr. 7, 1999

(51) Int. Cl.[7] .................................................. H04J 3/06
(52) U.S. Cl. ...................................... 370/354; 370/389
(58) Field of Search ................................ 370/354, 403, 370/543, 389, 506; 375/222, 254; 714/749

(56) References Cited

U.S. PATENT DOCUMENTS

| | | | | |
|---|---|---|---|---|
| 4,661,657 A | * | 4/1987 | Grenzebach et al. | 375/359 |
| 5,426,643 A | * | 6/1995 | Smolinske et al. | 375/354 |
| 5,477,550 A | * | 12/1995 | Crisler et al. | 714/748 |
| 5,666,383 A | * | 9/1997 | Huang et al. | 375/219 |
| 5,910,970 A | * | 6/1999 | Lu | 375/222 |
| 6,134,274 A | * | 10/2000 | Sankaranarayanan et al. | 375/254 |
| 6,157,612 A | * | 12/2000 | Weerackody et al. | 370/215 |
| 6,415,410 B1 | * | 7/2002 | Kanerva et al. | 714/749 |

* cited by examiner

*Primary Examiner*—Salvatore Cangialosi
(74) *Attorney, Agent, or Firm*—McDermott, Will & Emery

(57) ABSTRACT

A network node configured for transmitting and receiving data to and from other network nodes is able to adapt the transmission rate based on the network conditions. The node initially transmits the data to a receiving node at a first rate. If the data is not received error-free, the node is able to reduce the number of data bits of the current packet that are being transmitted and to increase the amount of redundant data. The node repeats the process until error-free transmission is obtained.

17 Claims, 5 Drawing Sheets

ADAPTIVE TRANSMISSION SYSTEM IN A NETWORK

TECHNICAL FIELD

The present invention relates to network communications and more particularly, to an adaptive transmission system used in a network.

BACKGROUND ART

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol and a prescribed network medium, such as twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL is used herein as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL-based service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line through a frequency combiner/splitter, which is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel and the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently quadrature amplitude modulated (QAM) signals, each carried over a distinct carrier frequency channel. The frequency separation between consecutive carriers is 4.3125 KHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is QAM to carry up to 15 bits of data on each cycle of the tone waveform (symbol). An example of a conventional DMT-based system is illustrated in FIG. 1.

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

As described above, multi-point networks using conventional technology are not suitable for in-home use. Additionally, even conventional multi-point networks requiring specialized wiring and having predetermined topologies often suffer from poor signal quality between two or more nodes in the network.

For example, the medium connecting two particular nodes may be of poor quality resulting in drastic signal attenuation and phase distortion. The attenuation and distortion often lead to data errors when transmitting the data over such a medium. Prior art systems often retransmit the data when errors occur. However, when the errors are caused by the communications medium or the network layout, simply retransmitting the data often results in another erroneous transmission.

SUMMARY OF THE INVENTION

There is a need for an arrangement that provides an adaptive data transmission system for use in a network.

There is also a need for an arrangement that provides an adaptive data transmission system for use in a network employing discrete multi-tone technology.

These and other needs are met by the present invention, where a data transmission device used in a network node includes a transmitter portion and a receiver portion. The transmitter transmits a data packet to a receiving node. When the data is received without errors, the receiving node transmits an acknowledgement signal to the transmitting node and the transmitting node is ready to transmit the next packet. However, when an error in transmission occurs, the transmitting node is able to retransmit a portion of the data, along with at least one redundant copy of the portion. If at least one of the redundant data portions is received without errors, an acknowledgement is sent back to the transmitting node. If errors still occur, the transmitting node is able to continue to reduce the number of bits sent and increase the amount of redundancy data until an error-free transmission occurs.

According to one aspect of the invention a device is configured to transmit and receive data over a communications medium. The device includes a transmitter configured to transmit a first packet comprising bits of data. The device also includes a receiver configured to receive an acknowledgement signal from a destination node indicating that the first packet was received without errors. The transmitter is further configured to transmit a second packet comprising a first plurality of portions, when the acknowledgement signal is not received. The first plurality of portions each include the same predetermined bits of the first packet.

Another aspect of the present invention provides a method of transmitting data from a network node. The method includes transmitting a first packet comprising bits of data. The method also includes receiving an acknowledgement signal from a destination node when the first packet was received without errors. The method further includes transmitting a second packet comprising a first plurality of portions, when the acknowledgement signal is not received within a preset period of time. The plurality of portions each include the same predetermined bits of the first packet.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference numeral designations represent like elements throughout.

BEST MODE FOR CARRYING OUT THE INVENTION

The present invention will be described with the example of a network node in a multi-point network using discrete multi-tone (DMT) technology. A description will first be given of an exemplary DMT-based network, followed by the arrangement for providing an adaptive transmission system. It will become apparent, however, that the present invention is also applicable to other types of networks.

NETWORK ARCHITECTURE OVERVIEW

Figure 1:
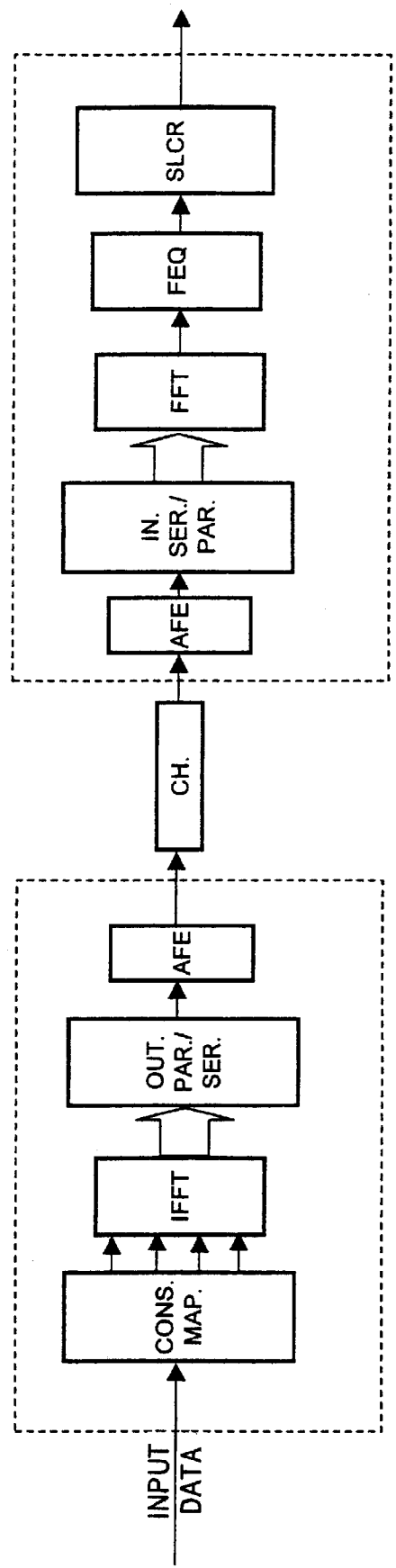
FIG. 1 is a block diagram of a conventional transmitter and receiver using discrete multi-tone technology.
Figure 2:
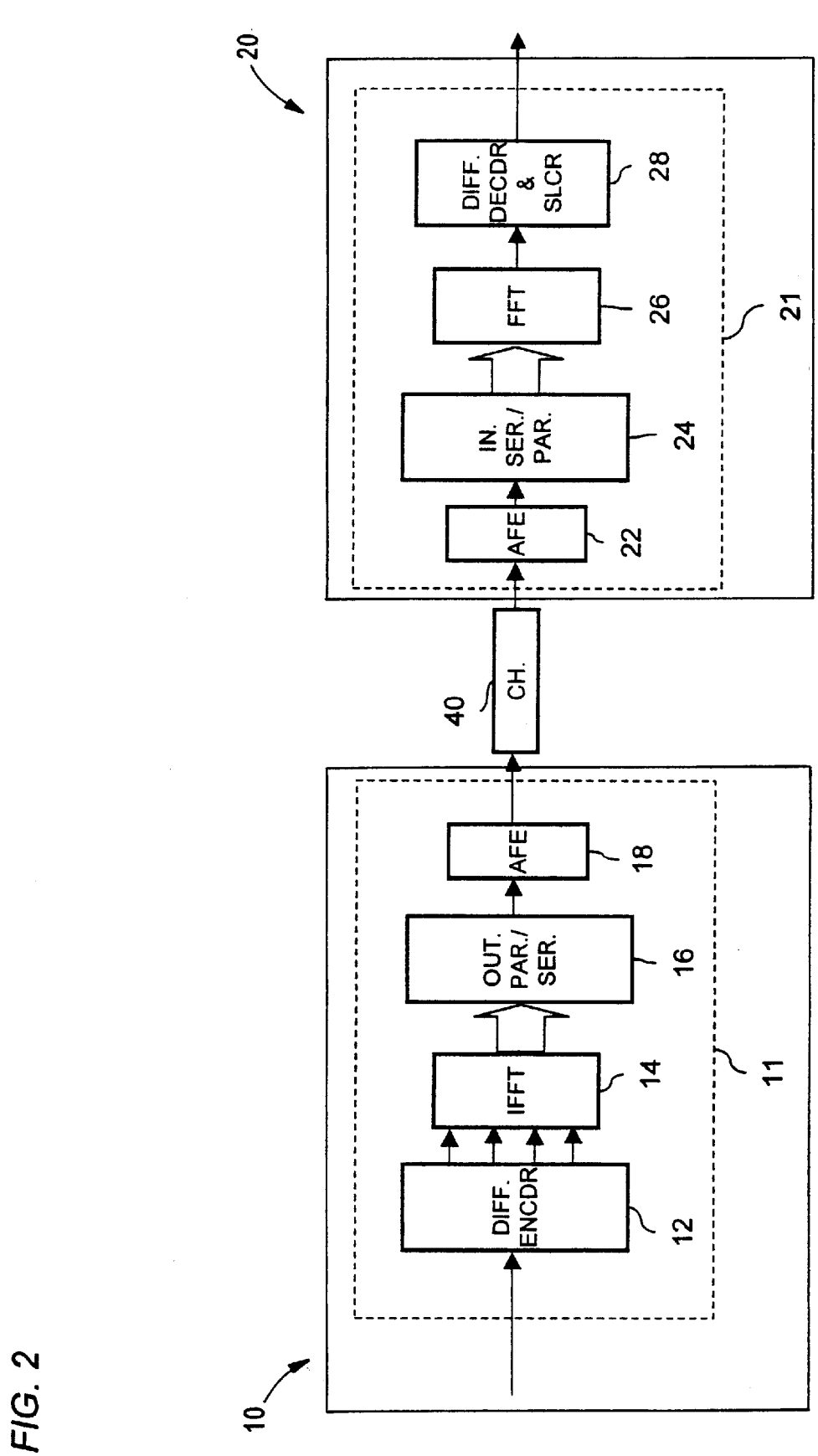
FIG. 2 is a block diagram illustrating a transmitter and receiver utilizing DMT according to an embodiment of the present invention.

FIG. 2 illustrates an exemplary system in which the present invention may be advantageously employed. Network nodes 10 and 20 are nodes, e.g., personal computers, in computer network 100. Each node is capable of transmitting and receiving data over channel 40. Channel 40 may be a twisted pair telephone line or another medium used to transmit data. In FIG. 2, a detailed transmitter 11 is shown in network node 10 and a detailed receiver 21 is shown in network node 20. It should be recognized, however, that each node 10 and 20 includes both the transmitter and receiver circuitry. Additionally, although not shown, other network nodes may be connected to nodes 10 and 20 in a ring topology, star topology or any other network topology.

According to the exemplary embodiment of the invention, network 100 in FIG. 2 utilizes DMT-based technology to transmit data over channel 40. The present invention however departs from conventional DMT technology by utilizing a differential coder 12 to encode an input bit stream into a predetermined number of tones. According to the exemplary embodiment, differential coder 12 uses 256 tones to encode the input bit stream. In alternative configurations, differential coder 12 may utilize other numbers of tones to encode the bit stream, based on the particular network requirements. Additionally, as described previously, in a DMT-based system utilizing 256 tones, each tone is capable of transmitting up to 15 bits of data on the tone waveform. According to the exemplary embodiment of the present invention, each tone is used to transmit two bits of data, which corresponds to four constellation points. However, in alternative configurations the present invention may transmit other numbers of bits per tone.

The differential coder 12 overcomes the drawbacks associated with a home network environment by utilizing a reference tone encoded with a reference bit pattern, before transmitting the input data stream. In alternative configurations, a sequence of reference tones, e.g., up to 256 tones, may be encoded with a reference bit pattern. Transmitter 11 modulates the reference tone(s) to carry the predetermined bit pattern over channel 40. For example, assume that bit pattern "00" is the predetermined bit pattern. The reference tone is then quadrature amplitude modulated to carry bit pattern "00". After processing by differential coder 12, the bit pattern "00" is represented by constellation point A in the complex plane shown in FIG. 3a. The constellation point represents the amplitude and phase of the signal at that particular tone.

The Inverse Fast Fourier Transform (IFFT) block 14, receives the tone information and converts the frequency domain-based tone information into a time domain-based waveform and outputs the time domain waveform to parallel-to-serial converter 16. A guard-band cyclic prefix may be applied between the IFFT block 14 and the parallel-to-serial converter 16 to transmit a prefix before the actual reference bits. The prefix data is discarded at the receiver 21, thereby eliminating the effects of intersymbol interference (ISI) associated with the start of the transmission. Parallel-to-serial converter 16 converts the data to a serial format for analog front end (AFE) block 18. AFE block 18 then transmits the data over channel 40 to node 20.

At node 20, AFE block 22 receives the line signal and performs amplification, filtering and digitizing. The signal is then fed into serial-to-parallel converter 24. After the data is converted to a parallel format, FFT block 26 computes the amplitude and phase information of the reference tone.

Figure 3A:
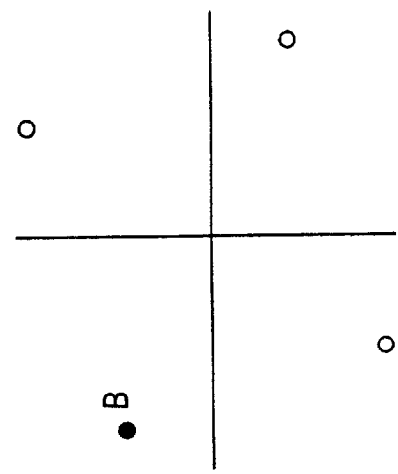
FIGS. 3a–3d schematically illustrate the constellation points associated with the transmission and reception of data using the transmitter/receiver of FIG. 2, according to an embodiment of the present invention.
Figure 3C:
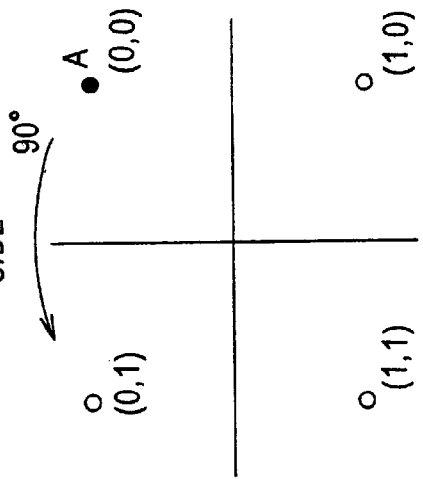
Figure 3B:
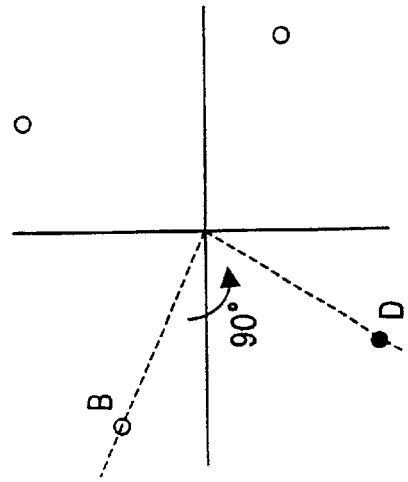

Differential decoder and slicer 28 then decodes the reference signal, represented by constellation point B in FIG. 3b. Next, the transmitter 11 transmits the actual input bit stream representing the data from network node 10 destined for network node 20. For example, assume the current bit stream being transmitted from node 10 to node 20 is bit pattern "01", which is illustrated by constellation point C in FIG. 3c.

Figure 3D:
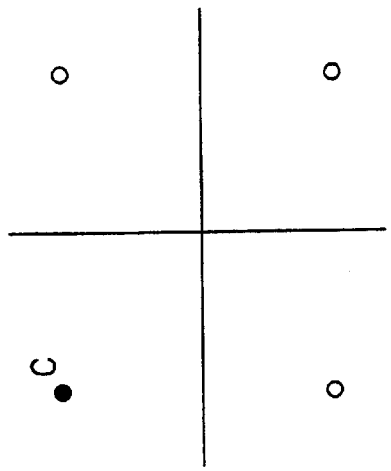

The receiver 20 receives the encoded carrier tone and processes the signal information using AFE block 22, serial-to-parallel converter 24, FFT block 26 and differential decoder and slicer block 28. After processing, the tone information is represented by constellation point D in FIG. 3d. The receiver 21 includes logic to compare the received point D with the previous received point B to determine the phase relationship between the points. Referring to FIG. 3d, the phase relationship between points B and D is 90 degrees, with point D leading point B. Using this information, the decoder and slicer block 28 assumes that the transmitted data bits encoded via the second carrier tone is 90 degrees out of phase with the reference data bits. In this example, the reference data bit pattern was "00", and a bit pattern leading "00" by 90 degrees maps to bit pattern "01", as shown in FIG. 3a. Therefore, the decoder and slicer block 28 in this example determines that the data bits transmitted with the second tone correspond to "01".

In the manner described above, the transmitting node 10 uses a reference tone encoded with a reference bit pattern at the beginning of every data packet. The phase distortion between the reference tone and the subsequent tone is then used to determine the value of the data associated with the first tone. Each successive tone is processed in a similar manner by comparing the phase relationship between the constellation point associated with the tone with the previous constellation point. By assuming that every constellation point will have the same degree of amplitude attenuation and phase distortion, the present invention is then able to determine the value of the data transmitted on each tone without knowing the particular channel characteristics. Advantageously, the present invention is able to decode transmitted data without the use of an equalizer to reverse the effect of amplitude attenuation or phase distortion associated with poor quality wiring.

In the exemplary embodiment, since a known reference bit pattern is transmitted before each packet of data as a new reference, any receiving node is able to determine the values of the subsequent received data bits in that packet. Advantageously, the system for transmitting/receiving data of the present invention is usable for different paths employing different channels in network 100.

The present invention, as described above, may be advantageously employed in a multi-point network. In such networks, a sending signal is transmitted only when there is data that needs to be transmitted. In accordance with an embodiment of the present invention, the transmitting node transmits a predetermined time mark to identify the beginning of a packet. In the exemplary embodiment, the time mark consists of one cycle of a sinusoidal waveform. The receiver node then matches received patterns with the predefined time mark pattern to identify the start of the packet, and thus begin decoding the received packet. In alternative configurations, the time mark may be several cycles of a sinusoidal waveform or any other predetermined waveform. Additionally, a predetermined transmitting node identifier may also be transmitted after the time mark for identification purposes. An exemplary node ID may consist of pulse amplitude modulated (PAM) sinusoidal waveforms unique to each network node.

ADAPTIVE TRANSMISSION

As described above, the network nodes in network 100 are able to transmit and receive data over channel 40 without knowing the particular channel characteristics. The present invention is also able to adapt the transmission rate based on the particular channel characteristics. For example, if the channel characteristics of channel 40 are poor and the receiving node is unable to receive the transmitted data without errors, the transmitting node is able to adapt the transmission rate to ensure that error-free data is received.

Figure 4:
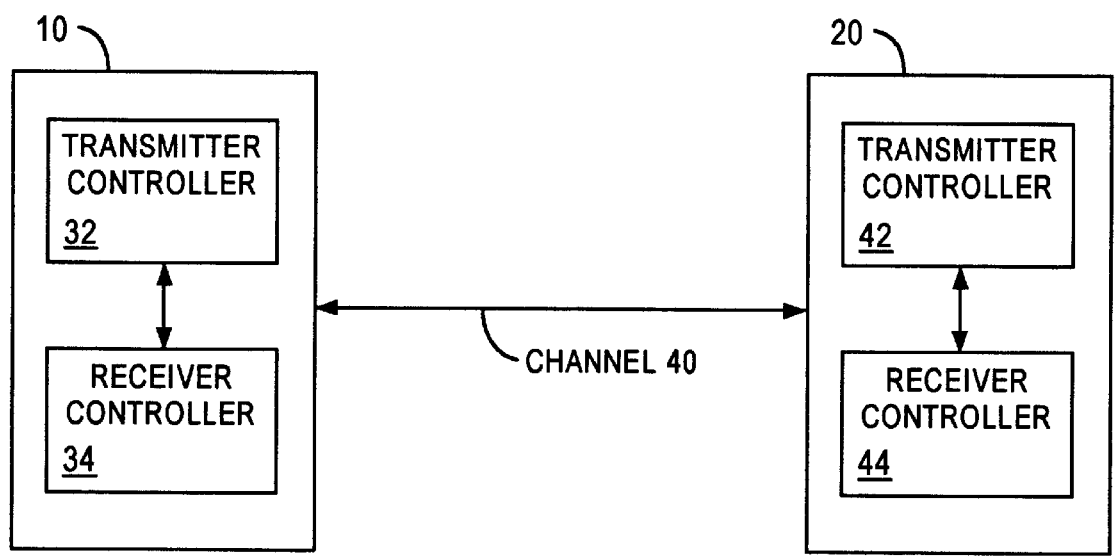
FIG. 4 is a block diagram of a pair of nodes used in a network in accordance with an embodiment of the present invention.

FIG. 4 is a block diagram of network nodes 10 and 20, in accordance with an embodiment of the present invention. Network node 10 includes transmitter controller 32 and receiver controller 34 and network node 20 includes transmitter controller 42 and receiver controller 44. These transmitter/receiver controllers of nodes 10 and 11, as described in detail below, enable the present invention to optimize the data transmission rate, based on the particular operating conditions of channel 40. The transmitter and receiver circuitry of FIG. 2 are not depicted in nodes 10 and 20 of FIG. 4 in order not to unduly obscure the thrust of the present invention.

Figure 5:
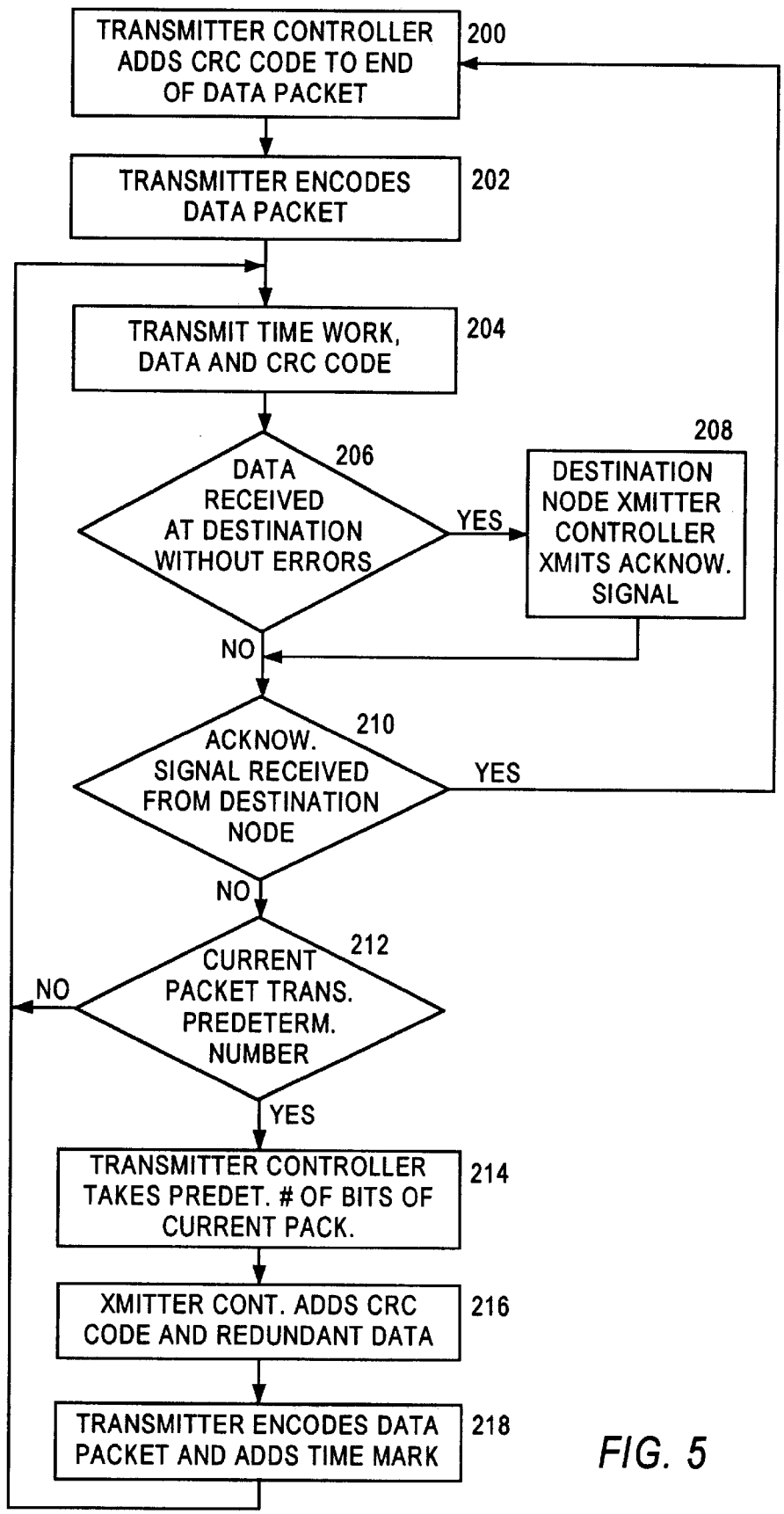
FIG. 5 is a flow diagram illustrating the method for transmitting data according to an embodiment of the present invention.

FIG. 5 is a flow diagram illustrating the method for providing an adaptive transmission system in accordance with an embodiment of the present invention. At step 200, transmitter controller 32 appends a cyclic redundancy check (CRC) code at the end of a packet of data to be transmitted over channel 40. For an Ethernet packet, the CRC code is included with the packet and therefore step 200 is skipped. In alternative configurations, other error check codes may also be utilized.

Node 10 then encodes the data packet and CRC code at step 202. Next, at step 204, node 10 transmits the predetermined time mark along with the data stream and CRC code over channel 40. According to the exemplary embodiment of the invention, the time mark is a PAM sinusoidal signal one period in duration, optionally followed by node ID information. The time mark information is transmitted at the start of each packet of data. The time marks essentially acts as a signal to alert the receiving node 20 that the data stream follows.

When node 20 receives the data step 206, the receiver controller 44, illustrated in FIG. 4, checks the received data and CRC code to determine whether the data was received without errors. If the receiver controller 44 determines that the data was received without errors, the transmitter controller 42 of node 20 transmits the predetermined time mark back to the transmitting node 10 as an acknowledgement signal, at step 208. Alternatively, any other predefined acknowledgement signal may be used. When the receiving node 20 determines that the data was received with errors at step 206, the receiving node does not transmit the acknowledgement signal.

Next, at step 210, the receiver controller 34 of transmitting node 10 waits a predetermined period of time for the acknowledgment time mark from node 20. When the acknowledgement time mark is received in the predetermined period of time at step 210, the process returns to step 200 for the transmission of a new packet. If the acknowledgment time mark is not received in the predetermined period of time, at step 210, the transmitting node 10 assumes that the data packet was received with errors or was lost.

Next, at step 212, the transmitter controller 32 of node 10 determines whether the current packet has been transmitted a predetermined number of times. According to the exemplary embodiment of the invention, the predetermined number is three. However, in alternative configurations, the predetermined may be any other number including one. If the current packet has not been transmitted the predetermined number of times, the process returns to step 204 where the current packet along with the time mark is retransmitted.

Next, assume that the current packet has been retransmitted the predetermined number of times without an acknowledgement signal from receiving node 20. The transmitter controller 32 of node 10 then reduces the effective data rate by transmitting only a portion of the current data packet, along with at least one redundant copy of the portion. More specifically, at step 214, the transmitter controller 32 retrieves a first predetermined number of bits at the head of the current data packet. For example, suppose the original data packet was 8 bits in length consisting of 11010001. At step 214, the transmitter controller retrieves only the predetermined number of bits from the beginning of this packet. Further assume in this example that the predetermined number of bits is four. In this situation, the transmitter controller 32 retrieves bits "1101", i.e., the first four bits of the current packet.

Next at step 216, the transmitter controller 32 appends the appropriate CRC code to the end of the new bit pattern. The transmitter controller 32 also provides at least one redundant copy of the new bit pattern and CRC code, after the first CRC code. In the example described above, and assuming that the number of redundant copies is one, the transmitter controller 32 would provide the following bit pattern for encoding: 1101(CRCcode)1101(CRCcode). However, in alternative embodiments, the number of redundant copies of the first bit pattern would generally be limited only by the bandwidth of the channel.

Next, the transmitting node 10 encodes the new data packet, at step 218, and transmitter controller 32 adds the time mark at the beginning of the packet to indicate the start of the packet. The process then returns to step 204.

The processes at steps 204–210 are the same as described previously with an exception at step 206. At step 206, the receiver controller 44 determines whether any one of the redundant data patterns in the packet has been received without errors. For example, assume that the receiver controller 44 determines that the second group of bits, 1101 in the example described above, was received without errors, based on the CRC code information. The receiving node 20 at step 208 would then transmits an acknowledgement time mark to transmitting node 10. Advantageously, a single reception of error-free data associated with any one of the redundant patterns enables the present invention to be more robust and to operate in conditions where conventional systems are unable to operate.

The processes at steps 212–218 continue until the receiver node 20 receives a group of data bits without errors and sends the acknowledgement signal to the transmitting node 10. Each time the process reaches step 214, the transmitter controller 32 reduces the number of bits of the current packet being transmitted and increases the number of redundant bit patterns.

According to the exemplary embodiment of the invention illustrated in connection with FIG. 2, assume that the first packet utilizes 256 carrier tones to transmit 512 bits of data as a data packet. The first time the process reaches steps 214–218, the transmitting node 10 may transmit the first 256 bits of the 512 bits. In this case, the first 128 tones are QAM to carry the first 256 bits. The next 128 adjacent tones in the frequency spectrum are similarly QAM to carry the redundant 256 bits. The process could logically continue until the first tone carried a single bit of information followed by the remaining 255 tones carrying the same redundant bit.

However, as a practical matter, the present invention would decrease the bit rate to a predefined level, based on the particular network requirements, before the process is stopped.

According to an alternative embodiment of the invention, the transmitter controller 32 may transmit control information after the time mark to indicate to the receiving node how the data information is to be interpreted. For example, after the time mark at the start of a packet and the optional node ID information, the transmitter controller 32 may transmit control information indicating the number of times a current packet is transmitted before the transmitter controller reduces the effective bit rate (step 212 in FIG. 5).

The control information may also include information regarding how many bits of the current data packet are to be transmitted after the transmitter controller 32 reduces the effective bit rate (steps 214–218 in FIG. 5). In this manner, the receiver node 20 does not have to prestore control information regarding how to interpret the received data.

In the manner described above, the present invention is able to adapt the transmission rate based on the particular channel characteristics. In situations where a particular channel experiences no errors at the maximum bit rate, the nodes utilize the maximum bandwidth and transmit data at the maximum rate. However, in situations where a channel is unable to support the maximum transmission rate, the present invention is advantageously able to reduce the transmission rate for that particular channel. In this manner, the present invention is able to optimize the data transmission rates between all nodes in a multi-point network, based on the particular channel characteristics. Additionally, the present invention is also able to be advantageously employed in a network environment, such as an in-home network, where wiring topology is non-standard.

In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. A device configured to transmit and receive data over a communications medium, comprising:
   a transmitter configured to transmit a first packet comprising bits of data; and
   a receiver configured to receive an acknowledgement signal from a destination node indicating that the first packet was received without errors, wherein
   the transmitter is further configured to:
      transmit a second packet comprising a first plurality of portions, when the acknowledgement signal is not received, and
      each of the first plurality of portions include the same predetermined bits of the first packet, and the predetermined number of bits of the first packet in each of the first plurality of portions of the second packet is less that a number of bits comprising the data of the first packet.

2. The device of claim 1, wherein the transmitter is configured to transmit the first packet a predetermined number of times, before transmitting the second packet.

3. The device of claim 1, wherein the receiver is further configured to:
   receive an acknowledgement signal from the destination node indicating that at least one of the plurality of portions of the second packet was received without errors.

4. The device of claim 3, wherein the transmitter is further configured to:
   transmit a third packet comprising a second plurality of portions when the acknowledgement signal, indicating that at least one of the portions of the second packet was error-free, was not received.

5. The device of claim 4, wherein each of the second plurality of portions of the third packet include the same predetermined number of bits of the first packet and the predetermined number of bits of the first packet included in each of the second plurality of portions of the third packet is less than the predetermined number of bits of the first packet included in each of the first plurality of portions of the second packet.

6. A device configured to transmit and receive data over a communications medium, comprising:
   a receiver configured to receive a first packet comprising bits of data and to determine whether the first packet was received without errors; and
   a transmitter configured to transmit an acknowledgement signal to a destination node, when the first packet was received without errors, wherein
   the receiver is further configured to:
      receive a second packet comprising a first plurality of portions, when the acknowledgement signal was not transmitted, and
      each of the first plurality of portions include the same predetermined bits of the first packet, and the predetermined number of bits of the first packet in each of the first plurality of portions of the second packet is less that a number of bits comprising the data of the first packet.

7. The device of claim 6, wherein the receiver is configured to receive the first packet a predetermined number of times, before receiving the second packet.

8. The device of claim 6, wherein the transmitter is further configured to:
   transmit an acknowledgement signal to the destination node indicating that at least one of the plurality of portions of the second packet was received without errors.

9. The device of claim 8, wherein the receiver is further configured to:
   receive a third packet comprising a second plurality of portions when the acknowledgement signal, indicating that at least one of the portions of the second packet was received without errors, was not transmitted, wherein
   each of the second plurality of portions of the third packet include the same predetermined bits of the first packet and the predetermined number of bits of the first packet included in each of the second plurality of portions of the third packet is less than the predetermined number of bits of the first packet included in each of the first plurality of portions of the second packet.

10. In a network node that transmits and receives data over a communications medium, a method of transmitting data comprising:
   transmitting a first packet comprising bits of data; and
   receiving an acknowledgement signal from a destination node when the first packet was received without errors; and
   transmitting a second packet comprising a first plurality of portions, when the acknowledgement signal is not received within a preset period of time, wherein each of the first plurality of portions include the same predetermined bits of the first packet, and the predetermined number of bits of the first packet in each of the first plurality of portions of the second packet is less that a number of bits comprising the data of the first packet.

11. The method of claim 10, comprising:

transmitting the first packet a predetermined number of times, before transmitting the seconds packet.

12. The method of claim 10, comprising:

receiving an acknowledgement signal from the destination node when at least one of the plurality of portions of the second packet was received without errors.

13. The method of claim 12, comprising:

transmitting a third packet comprising a second plurality of portions when the acknowledgement signal, indicating that at least one of the portions of the second packet was received error-free, was not received.

14. The method of claim 13, wherein each of the second plurality of portions of the third packet include the same predetermined bits of the first packet and the predetermined number of bits of the first packet included in each of the second plurality of portions of the third packet is less than the predetermined number of bits of the first packet included in each of the first plurality of portions of the second packet.

15. A device configured to transmit and receive data over a communications medium, comprising:

a transmitter configured to transmit a plurality of discrete modulated tones representing a first packet with each of the plurality of tones representing at least one bit of data; and a receiver configured to receive an acknowledgement signal from a destination node indicating that the first packet was received without errors, wherein the transmitter is further configured to:

transmit a second plurality of discrete modulated tones representing a first plurality of portions, when the acknowledgement signal is not received, and all the first plurality of portions together represent the same predetermined bits of the first packet;

each of the first plurality of portions include the same predetermined bits of the first packet, and the predetermined number of bits of the first packet in each of the first plurality of portions of the second packet is less that a number of bits comprising the data of the first packet.

16. The device of claim 15, wherein each of the first plurality of portions is transmitted using the same number of tones.

17. The device of claim 16, wherein each of the first plurality of portions is transmitted over a block of tones that are adjacent to each other in the frequency spectrum.

* * * * *